Patented Feb. 13, 1945

2,369,246

UNITED STATES PATENT OFFICE 2,369,246

TITANIUM OXIDE PIGMENT PRODUCTION

James Howard Peterson, Wilmington, Del., assignor to E. I. du Pont de Nemours & Company, Wilmington, Del., a corporation of Delaware No Drawing. Application January 9, 1942, Serial No. 426,249

20 Claims. (Cl. 106—300)

This invention relates to the production of novel titanium oxide pigments and methods for preparing the same. More particularly, it has reference to the manufacture of improved white, titanium oxide pigments which, on X-ray analysis, reveal substantially the diffraction pattern of crystalline rutile.

More specifically, the invention relates to the preparation of improved rutile titanium oxide pigments possessing superior whiteness, color, brightness, light resistance and other essential pigment characteristics, rendering said pigments admirably suited for all types of commercial use, whether in exterior or interior applications.

Titanium oxide, X-ray analysis reveals, occurs in the three crystalline modifications; anatase, brookite and rutile. Of these, anatase has the lowest refractive index, while rutile has the highest refractive index and therefore the greatest potential hiding power. Anatase and rutile comprise the forms most suitable for pigments. Anatase raw pigment is obtained from the hydrolysis of titanium sulfate solutions, while raw pigment rutile may be obtained upon hydrolytic precipitation of titanium chloride solutions upon observing carefully chosen conditions.

Although anatase has the lowest refractive index, most present-day commercial titanium oxide pigments are characterized by that modification. Titanium sulfate solutions from whence said anatase is derived can be readily prepared upon attacking titaniferous ores, especially ilmenite, with sulfuric acid. The resulting solutions corrode plant equipment to a lesser degree than do chloride solutions and hence are more attractive for use in economically manufacturing commercial titanium oxide pigments. Moreover, rutile has a lower impurity tolerance than does antase, and the degree of purity of solutions employed in anatase production is clearly outside the minimum required for commercially acceptable rutile. When the suitably purified, hydrous $TiO_2$ obtained from the hydrolysis of the titanium sulfate solution is calcined at temperatures ranging from, preferably, about 750° C. to 1000° C., its essential pigment properties, such as hiding power, tinting strength, oil absorption, etc., are developed. When the calcined anatase is subjected to the usual pigment finishing treatments, the final $TiO_2$ pigment product results.

Rutile production from chloride solutions presents a much less attractive process for commercial exploitation, this being due, principally, to the fact that an extremely difficult, expensive type of operation is required in which careful control must always be exercised. Additionally, the notoriously corrosive character of chloride solutions will inflict considerable damage to plant equipment. All of this, coupled with the great difficulty encountered in obtaining a final product of commercially acceptable color and brightness, has rendered such process non-suitable for commercial exploitation.

As stated, rutile has a much lower impurity tolerance than does anatase and pigments of the latter type having good color can be produced by hydrolysis of titanium sulfate solutions with a degree of purity which is clearly outside the minimum required for commercially acceptable rutile. If the anatase hydrolysate from these sulfate solutions is calcined alone at a sufficiently high temperature (in excess of 1000° C. and, say, about 1050° C. or above), conversion to rutile can be effected. Many processes, a principal object of which is to manufacture rutile in this fashion, have already been proposed. The excessively high temperatures which these processes require under normal conditions, however, so markedly affects or drops the pigment color that the potentially higher hiding power and tinting strength of the higher (rutile) refractive index modification is not realized. The high temperatures required cause sintering and agglomeration of pigment particles, which, with the resulting formation of objectionable grit and aggregates, induces an adverse pigment particle size growth. This is reflected in the relatively poor color, brightness, texture, tinting strength, softness and hiding power of the final pigment, often rendering it wholly unfit for many intended uses, especially in coating compositions, such as paints, enamels and lacquers, wherein it is essential that the pigment possess these properties. These very serious drawbacks therefore preclude the possibility of adopting these high temperature conversion methods in rutile pigment manufacture. A real need for a commercially adaptable process has existed, therefore, which will enable one to obtain a rutile titanium oxide pigment, the brightness, color and light resistance characteristics of which are desirably high and commercially acceptable and satisfactory.

It is among the objects of this invention to overcome the foregoing and other disadvantages attending prior titanium oxide rutile pigment manufacture, and to provide novel and useful methods for attaining these objects. A salient object includes the production of a novel rutile titanium oxide pigment which has outstandingly improved color, brightness and light-resistance qualities. A special object is to provide a white, relatively durable, and weather-resistant rutile pigment of commercially acceptable color, brightness and light-fastness, with accompanying high tinting strength, hiding power, texture, and satisfactorily small, uniform particle size, together with other essential pigmentary properties. Another particular object is to provide a novel process for obtaining such improved form of rutile pigment and by conversion through calcination treatment of anatase in the presence of mixtures of novel forms of treating agents under controlled conditions. Additional objects will appear from the ensuing description of my invention.

These and other objects are attainable in this invention which broadly comprises calcining titanium oxide in the presence of a relatively minor amount of one or more alkali metal compounds and one or more compounds of a polyvalent metal, forming substantially insoluble, white oxides, from the group consisting of aluminum, zinc, magnesium, and baryllium.

In a more specific and preferred embodiment, the invention comprises obtaining an improved rutile titanium oxide pigment exhibiting excellent color, brightness, light-resistance and other essential pigment properties, by converting anatase titanium oxide raw pigment to rutile through calcination treatment at a relatively low temperature in the presence of a relatively small amount of a mixture, comprising a soluble alkali metal salt, e. g., of sodium or potassium, and a soluble salt of a metal from the group consisting of aluminum, zinc, magnesium, and beryllium.

One practical and preferred adaptation of the invention will now be described in which precipitated, raw anatase pigment is suitably treated in order to obtain my improved form of rutile pigment having all of the desired characteristics alluded to. Thus, there is conveniently added to or admixed with or incorporated in an aqueous slurry or paste of relatively pure, precipitated anatase raw pigment, a relatively minor or small amount of a salt mixture, comprising (1) a water-soluble alkali metal salt (preferably sodium or potassium sulfate) or a mixture of two or more such salts, and (2) a water-soluble salt from the group consisting of aluminum, zinc, magnesium, and beryllium (preferably aluminum sulfate), said anatase raw pigment so treated preferably comprising that resulting from the methods set forth in the copending application of John L. Keats and myself, Ser. No. 426,250, filed January 9, 1942. Preferably, also, the sulfate solution from whence said hydrolysate is derived comprises that resulting from the sulfuric acid attack or dissolution of Indian Beach Sand ilmenite or Quilon ore, and in accordance with, for instance, U. S. Patent 1,504,671. The pigment slurry may be conveniently mixed with the salt mixture by introducing a solution of the latter into said slurry, with the salt solution at such a concentration as will provide in the raw pigment prior to calcination from about 0.05% to about 2% of an alkali metal salt, and an amount of aluminum, zinc, magnesium, or baryllium salt equivalent to from about 0.05% to about 2.0% of the corresponding oxide, both concentration ranges being on the basis of the $TiO_2$ present. After incorporation of the salts in the pigment slurry, the resulting mixture is thoroughly stirred, either mechanically or by other types of agitation, to uniformly mix or disperse the treating agents throughout the pigment. Excess water, if any, is then conveniently removed from the aqueous slurry by filtering, centrifuging or other type of dewatering operation. The pigment-salt mixture thus obtained is then calcined in a conventional type of calciner, such as of the rotary or muffle furnace type, the calcination treatment being conducted for such time period as will satisfactorily develop essential pigment properties in the raw pigment and substantially completely convert the anatase to rutile. In effecting calcination, temperatures of the order of those normally employed in anatase $TiO_2$ pigment manufacture may be used, although temperatures of at least 900° C. and from about 950° C. to not in excess of substantially 1000° C. are preferably employed. The duration of calcination treatment is variable, but obviously depends upon the temperatures employed and the properties desired in the final or ultimate pigment. Normally, periods ranging from about 1 to 2 or 3 hours at the indicated preferred temperatures will suffice for inducing desired development of necessary pigment properties and relatively complete rutile conversion. After calcination, the pigment is cooled and, if desired, is subjected to the usual wet or dry grinding treatments, or may be otherwise processed or finished as desired. The final rutile product, due to its outstandingly high values in respect to color, whiteness, brightness, light-fastness, softness, tinting strength, hiding power, etc., will be eminently suited for use in all pigment applications, and especially in coating composition formulations, such as paints, enamels, lacquers, etc., as a delusterant in rayon or other artificial silk materials, or as a pigmenting substance in linoleum, paper making, or other well-known uses.

In order to more particularly illustrate the invention, the following specific examples are given:

*Example I*

An aqueous slurry of a thoroughly washed anatase $TiO_2$ hydrolysate, prepared by a commercial hydrolytic precipitation process following the disclosure of Blumenfeld U. S. Reissue Patent 18,854, of a titanium sulfate solution, obtained from the $H_2SO_4$ dissolution of Quilon ilmenite ore, is divided into two parts, designated "A" and "B." To part "A" is added potassium sulfate in an amount corresponding to about 0.5% of the weight of the $TiO_2$ present in the slurry. To part "B" is added the same amount of potassium sulfate and, in addition, there is added an amount of aluminum sulfate equivalent to 0.2% $Al_2O_3$, on the $TiO_2$ basis. The salt-treated products are then dried and calcined to give rutile products. The rutile product obtained by calcination in the presence of the aluminum salt is distinctly superior in color to that obtained without aluminum treatment.

*Example II*

Anatase raw pigment is prepared as in Example I by a commercial process following the disclosure of U. S. Reissue Patent 18,854. The raw pigment thus made was then mixed with a rutile promoter and treated in accordance with the methods described in the copending application of John L. Keats and myself, Ser. No. 426,250, filed January 9, 1942. The resulting product is slurried in water and the wet slurry divided to give parts designated as "A" and "B." To part "A" is added 0.75%, on the $TiO_2$ basis, of a salt mixture consisting of 80% $K_2SO_4$ and 20% $Na_2SO_4$. To part "B" is added the same amount of mixed $K_2SO_4$ and $Na_2SO_4$ as in part "A," and in addition there is added an amount of aluminum sulfate equivalent to 0.25% $Al_2O_3$ on the $TiO_2$ basis. The salts are added as solutions containing 50–100 g./l. The salt-treated products are dried and calcined to give rutile products. The rutile product obtained by calcination in the presence of the aluminum is distinctly superior in color to that obtained without aluminum, as shown by the following table:

| Designation | Percent of alkali salt added | Percent $Al_2O_3$ added | Calc. temp. | Percent rutile | Color | Strength |
|---|---|---|---|---|---|---|
| A | 0.75 | None | 950 | 100 | Brown | 162 |
|  |  |  | 975 | 100 | Gray | 172 |
| B | 0.75 | 0.25 | 950 | 100 | 13:2Y | 169 |
|  |  |  | 975 | 100 | 10:3Y | 180 |

Example III

Anatase raw pigment is prepared by hydrolytic precipitation from a titanium sulfate solution obtained by attacking Indian Beach Sand ilmenite ore with sulfuric acid containing 2.8 mols $H_2SO_4$ per mol $TiO_2$ in addition to the $H_2SO_4$ combined with iron as $FeSO_4$. Seed for the hydrolysis is prepared by slowly heating a solution of titanium tetrachloride containing 10 g. $TiO_2$ per liter to 85° C. and holding at this temperature for 20 minutes to form a colloidal sol. The titanium sulfate solution is added to the sol to give a seeded solution containing 10% seed on the $TiO_2$ basis, at a total $TiO_2$ concentration of 65 g./l. The seeded solution is heated slowly (½° C. per minute) from 65° C. to boiling and boiled 15 minutes. The hydrolysis slurry is filtered and the precipitate washed until substantially free of iron salts. The washed precipitate is divided into two parts, A and B. Salt treatment of part A comprises slurrying the raw pigment to a concentration of 200 g. $TiO_2$ per liter, addition of 3 g./l. of a mixed salt consisting of 80% $K_2SO_4$ and 20% $Na_2SO_4$ and filtering until the mixed salt remaining in the cake is equal to about 0.6–0.7% on the $TiO_2$ basis. The cake is then dried and calcined at 975° C. to give rutile. Salt treatment of part B includes the same addition as in A and in addition there is added an amount of $Al_2(SO_4)_3$ to give the equivalent of 0.25% $Al_2O_3$ on the $TiO_2$ basis in the raw pigment after filtering. The product is then calcined at 975° C. to obtain rutile the same as in part A. The finished rutile pigment in B, using $Al_2O_3$, is distinctly superior in color to A, in which no $Al_2O_3$ is added. As an illustration, a rutile pigment prepared by the above procedure and treated in the raw pigment stage with mixed $Na_2SO_4$ and $K_2SO_4$ and $Al_2(SO_4)_3$ was graded 10:3Y in color, but when treated with the alkali metal salt mixture alone and with no Al salt, the color was yellow and was too poor to be graded on the numerical scale used. The pigment containing aluminum, which was graded 10:3Y in color, was at least 6 points better in color than the corresponding pigment containing no aluminum. In the grading the lowest standard used was rated 6:4Y and the pigments evaluated were those having numerical color rating of 4 or above.

Example IV

A titanium sulfate solution was prepared in the usual manner from Indian ilmenite and contained about 250 grams of $TiO_2$ per liter and sulfuric acid equivalent to 1.7 mols per mol of $TiO_2$. This solution was hydrolyzed in accordance with the process disclosed in U. S. Patent Re. 18,854. The raw pigment was then mixed with a rutile promoter and treated in accordance with the methods described in the copending application of John L. Keats and myself, Ser. No. 426,250, filed January 9, 1942.

The raw pigment was divided into four portions which were treated as follows:

A. Control (no salt addition).

B. Raw pigment slurried with water to give a suspension containing 200 grams $TiO_2$ per liter, and to the slurry was added 3 grams per liter of a mixed salt consisting of 80% $K_2SO_4$ and 20% $Na_2SO_4$, and the suspension filtered. The filter cake contained 0.6 to 0.7% mixed salt on the $TiO_2$ basis.

C. To a suspension of raw pigment, prepared as in (B) above, was added aluminum sulfate ($Al_2(SO_4)_3$), equivalent to 0.5 gram of $Al_2O_3$ per liter. The suspension was filtered leaving 0.1 to 0.25% $Al_2O_3$ on the $TiO_2$ basis in the cake.

D. To a suspension of raw pigment prepared as in (B) above, was added 3 grams of mixed salt per liter as in (B) and aluminum sulfate ($Al_2(SO_4)_3$) equivalent to 0.5 gram $Al_2O_3$ per liter as in (C). The suspension was filtered leaving a cake containing about 0.6 to 0.7% mixed salt and 0.1 to 0.25% aluminum oxide on the $TiO_2$ basis.

The products described above were dried at 110° C. and calcined in a rotary calciner at 960° C. to develop their pigment properties and cause conversion to substantially rutile. The calcined products were wet-ground in a pebble mill for 16 hours and the ground products filtered and dried at 110° C.

The pigment products were then tested for rub-out color, using wet linseed oil pastes of the products. The products were also tested for film color in the form of dry draw-downs. Film color was determined by observing the dry paint film in north light after exposure to light for at least 1 hour. The films when first observed after being in the dark for 24 hours or more showed very little difference in color. Within a few seconds, however, films A, B and C began to discolor while D remained essentially unchanged. The differences between the films increase as the exposure time increases.

The results of the tests carried out are summarized below:

| Sample | Salt Treatment | Percent rutile in calcined pigment | Rub-out color | Paint film color |
|---|---|---|---|---|
| A | None | 100 | Definitely poorer than C; off the numerical scale. | Below zero. |
| B | Mixed salt (80% $K_2SO_4$+20% $Na_2SO_4$) | 95 | Poor-yellow, off the numerical scale | Do. |
| C | $Al_2(SO_4)_3$ | 100 | 0 | 5. |
| D | Mixed salt (80% $K_2SO_4$+20% $Na_2SO_4$)+$Al_2(SO_4)_3$ | 98 | 14:5Y | 10. |

The above data indicate that the combined alkali metal and aluminum salt treatment is distinctly better than alkali metal salt alone or aluminum salt alone from the standpoint of rub-out and film color.

*Example V*

An aqueous slurry of a thoroughly washed anatase $TiO_2$ hydrolysate obtained by hydrolytic precipitation from a titanium sulfate solution, as in Example I, is mixed with a small amount of a rutile promoter, as contemplated in my aforesaid copending application with John L. Keats, and the seeded mixture is then treated as proposed in said application. The resulting product is then divided into two parts designated "A" and "B." Part "A" is treated with 0.75%, on the $TiO_2$ basis, of a mixed salt containing 80% $K_2SO_4$ and 20% $Na_2SO_4$ and the product calcined to rutile. The color of the calcined product is relatively poor. Part "B" is treated with the same mixed alkali salt, and in the same proportion as in "A," but in addition there is added a small amount of zinc sulfate, equivalent to 0.1% ZnO, on the $TiO_2$ basis. The product is then calcined to give a rutile pigment. The rutile product obtained by calcination in the presence of alkali plus zinc sulfate is distinctly superior in color to the rutile product obtained from calcination with alkali salt alone.

*Example VI*

The procedures of Example V are repeated, except that in lieu of the use of zinc sulfate in the treatment and calcination of part B, magnesium sulfate, equivalent to 0.1% MgO on the $TiO_2$ basis, is employed. As in Example V, the color of the calcined rutile product containing the alkali salt alone is found to be poor, while the rutile product obtained by calcination in the presence of alkali salt plus magnesium sulfate is distinctly superior in color, as will be evident from the following table:

| Designation | Percent mixed alkali salt (80% $K_2SO_4$, 20% $Na_2SO_4$) | Percent MgO as $MgSO_4$ | Calc. temp. | Crystal form calcined product percent rutile | Color |
|---|---|---|---|---|---|
| A | 0.75 | None | 975 | 100 | Brown. |
| B | 0.75 | 0.1 | 975 | 100 | 9:5Y. |

*Example VII*

The procedures of Example V are repeated, except that in lieu of the use of zinc sulfate in the treatment and calcination of part B, beryllium sulfate, equivalent to 0.1% BeO, on the $TiO_2$ basis, is employed. As in Example V, the color of the calcined rutile product containing the alkali salt alone is found to be poor, while the rutile product obtained by calcination in the presence of alkali salt plus beryllium sulfate is distinctly superior in color, as will be evident from the following table:

| Designation | Percent mixed alkali salt (80% $K_2SO_4$, 20% $Na_2SO_4$) | Percent BeO as $BeSO_4$ | Calc. temp. | Crystal form calcined product percent rutile | Color |
|---|---|---|---|---|---|
| A | 0.75 | None | 975 | 100 | Brown. |
| B | 0.75 | 0.1 | 975 | 100 | 6:5Y. |

The color, brightness, tinting strength and crystal structure values given herein were determined by the methods described or referred to in U. S. Patent No. 2,253,551 to James E. Booge, dated August 26, 1941. In accordance with the color determining test, $TiO_2$ pigments, to be commercially useful, should have a value of 10 or higher for actual brightness before correction for off-tint. When a pigment is designated as having a color of "13:2Y," it means that the pigment has an intrinsic brightness of 15 before correction for off-tint, and is off-tint towards the yellow end of the spectrum to the extent of 2 points, measured by the arbitrary scale employed in said color test. If a pigment, such as described in Example VI, is given a color rating of 9:5Y, it has, in accordance with this scale, an intrinsic brightness of 14 and is off-tint to the yellow to the extent of 5 points.

The relative stability to light of two different pigments may be determined by preparing flow-outs of a paint containing the pigments, allowing the flow-outs to dry, covering part of the film with black paper or other covering, allowing the film to stand in the dark for a period of time, e. g. overnight, and then exposing the partly-covered films to ordinary daylight for a period of time varying from 15 seconds to 1 hour or more. At intervals the covering over part of each film is lifted momentarily to compare the portion which is exposed to light with that which is unexposed. Relatively unstable films show definite differences between the exposed and unexposed portions after only a few seconds to a few minutes exposure. Films containing pigments which are stable to light show only slight differences between the exposed and unexposed parts even after prolonged exposure.

While the invention has been shown and described in its application to certain specific and preferred embodiments thereof which advantageously fulfill the objects primarily enumerated, it is obviously not limited thereto since said description and enumerated examples are given merely by way of illustration and not in limitation. Accordingly, though I have enumerated specific types, amounts and combinations of useful treating agents adapted to improve particularly the color, brightness and light-resistance characteristics of titanium oxide pigments and/or promote anatase conversion to rutile at relatively low temperatures well below those heretofore considered necessary, they are only preferred and can be conveniently varied. Thus, in addition to the indicated and preferred alkali metal salts of sodium and/or potassium sulfate, or mixtures thereof, other alkali metal compounds or mixtures thereof may be used, either alone or in conjunction with said sodium and/or potassium sulfate. Examples of such additional alkali salts include the chlorides and carbonates of sodium and potassium, and the chlorides, sulfates, carbonates, etc., of lithium, rubidium or cesium. Again, in lieu of using the preferred 0.5% to about 2% concentrations of alkali metal salts, lower or higher quantities may be employed, if desired, with amounts ranging from, say, about 0.01% to about 20%, also on the $TiO_2$ basis, being contemplated. While it is preferred, when sodium sulfate and potassium sulfate mixtures are employed, that the ratio of potassium sulfate to sodium sulfate be about 4:1, this is variable, and, if desired, potassium sulfate alone can be used in conjunction with the aluminum, zinc, magnesium, or beryllium salt. In such instances, however, higher calcination temperatures will be required than are needed when using sodium sulfate or sodium sulfate and potassium sulfate in conjunction with the contemplated polyvalent metal salts. Hence, the alkali salt treatment can vary all the way from substantially straight potassium sulfate to substantially straight sodium sulfate, provided proper adjustment in calcining temperatures is made. Pigments treated with potassium salts usually require higher calcination temperatures in bringing about the desired rutile conversions.

The type and amount of polyvalent metal compound forming substantially insoluble, white oxides, and especially compounds of aluminum, zinc, magnesium, and beryllium, or mixtures thereof, to be employed in conjunction with the contemplated alkali metal compound or compounds, is also variable. Thus, while the sulfates of the indicated metals, in amounts equivalent to from about 0.05% to about 0.5%, based on the TiO₂ and calculated as the oxide of the metal, are preferred for use, other compounds of said metals, or mixtures, as well as different amounts, (ranging from, say 0.1% to about 5%, on the TiO₂ basis) also can be employed. Accordingly, in addition to the preferred sulfates, the oxides, hydroxides, carbonates, chlorides, etc. of the mentioned metals can be used, as can any compound of said metals which decomposes at the calcination temperatures used to yield a relatively white oxide. Where any combination of two or more of said polyvalent metal compounds or salts is to be employed with the alkali metal agents, the amount used in such mixture is substantially the same as that suggested for the individual polyvalent metal compound or salt. Aluminum sulfate comprises a preferred type of salt for use in the invention and hence salts which supply aluminum oxide or which supply both aluminum oxide and the alkali metal salt can be used. Representative salts of the first class include anhydrous and hydrated aluminum sulfates as well as ammonium alum, while those of the second class include the alkali metal alums, such as, for example,

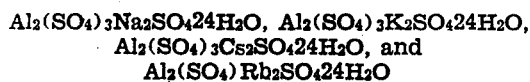

When alkali metal alums are employed, it will be necessary that additional alkali be added to provide the proper ratio of alkali metal salt to aluminum oxide.

As stated, the titanium oxide is preferably mixed with my novel treating agents by adding solutions or water suspensions of the mixed agents (especially salts thereof or compounds which form water-soluble salts when in contact with the acid-containing titanium oxide raw pigment) to an aqueous slurry of the titanium oxide. Alternatively, other convenient modes of incorporating the agents in the titanium oxide may be resorted to, if desired, as may separate addition or admixture of the agents with the TiO₂ and while said agents or TiO₂ (or both) are in relatively dry, as distinguished from relatively wet, or are in aqueous slurry condition. As will be evident, the manner in which the treating agent is incorporated in the TiO₂ is not critical, since in accomplishing the primary objects of my invention it is only essential that the titanium oxide be calcined in the presence of the mixtures of compounds contemplated.

While calcination temperatures ranging from substantially 850 to 975° C. and to not exceeding 1000° C. are preferred for use because affording optimum benefits under the invention, higher or lower temperatures can also be employed. As stated, the use of any given temperature or range thereof will largely depend upon composition or inherent nature of the titanium oxide under treatment, the particular pigment properties to be developed and the crystalline form or amount of rutile which the finished product is to possess. Hence, temperatures ranging to as low as substantially 750° C. and to as high as 1050° C. or 1100° C. or higher may be used, because the presence of my mixed salts or treating compounds permits the use of even temperatures of the indicated higher order with beneficial effects. In effecting conversions to rutile, I utilize such calcination temperatures and times as will promote conversion of a major portion of the TiO₂ under treatment, and preferably at least 80% conversion. In obtaining optimum results, I prefer to employ such temperatures as will provide 90 to 100% and in excess of 95% conversions.

While illustratively described as applied to certain preferred embodiments in which conversion of precipitated anatase raw pigment to rutile is had, the invention has general application to the treatment and production of all forms of titanium oxide, whether in the anatase or rutile crystalline state, whether in raw, uncalcined, or undeveloped pigment condition, whether previously calcined or developed, and whether the final pigment is to comprise anatase or rutile, or mixtures of both. Hence, treatment of all such forms of TiO₂ is contemplated, the raw TiO₂ pigment precipitates or hydrolysates resulting either from neutralization or hydrolysis of titanium salt solutions, particularly the sulfate, chloride, nitrate, etc., and in accordance with the procedures of the copending applications of John L. Keats and myself, Ser. No. 426,250, filed January 9, 1942; of John L. Keats and Henry M. Stark, Ser. Nos. 283,050 and 283,052, filed July 6, 1939, and Ser. No. 426,247, filed January 9, 1942, by Carl M. Olson; or Carl M. Olson and James E. Booge, Ser. No. 426,248, filed January 9, 1942, being imminently suitable and preferred. Also, the hydrolysates obtained from the procedures of U. S. Patents 18,854, 18,790, or 2,062,133, may be treated under the invention and with beneficial results. The term "hydrous titanium oxide," in the appended claims, generically embraces all such forms of TiO₂ precipitates or hydrolysates. The term "low temperature converting hydrous TiO₂" in said claims applies to hydrolysates obtained from the copending applications mentioned, which possess the unique characteristic of converting to rutile when calcined at temperatures ranging usually from substantially 750–1000° C. When anatase is calcined at a sufficiently high temperature to convert it to rutile, a disadvantageous, marked drop in pigment color occurs, demonstrating that the same amount and kind of impurity has a much more pronounced effect on color in rutile than on anatase. Moreover, irrespective of whether the pigment is directly produced in the rutile form or through anatase, much higher purity is required for satisfactory color in rutile than is the case with anatase. The alkali metal salt plus aluminum, zinc, magnesium, or beryllium salt treatment herein contemplated appears to have a minimizing effect on color of the impurities present and markedly improves the light stability of the pigment, making it possible to prepare highly satisfactory commercial pigments from stocks which could not otherwise be used.

This remarkable effect on light stability is apparent from the fact that titanium oxide pigments which discolor badly on exposure to light become substantially light-stable when treated in accordance with my invention.

The advantageous, unexpected results accruing by reason of my invention are not obtainable from a mere use of the individual alkali metal salts or of aluminum, zinc, magnesium, or beryllium salt treatment alone. Neither alkali metal salt treatment alone nor aluminum, zinc, magnesium, or beryllium salt treatment yields titanium oxide pigments equivalent in properties to those which result herein or to those required in commercial rutile pigments. That my combined salt treatment is critical to these beneficial results is demonstrated by the above examples which disclose that the titanium oxide is not rendered light-stable by calcination with alkali metal salt alone, whereas when treated with an aluminum salt and an alkali metal salt or a combination of alkali metal salts, no color change occurs in the pigment when similarly exposed to light. Thus, my improved effects are not merely additive, but are of a character and magnitude wholly different from those which might be expected from the known results of the individual salt treatment. This is shown especially from the results of Example IV, wherein the amounts of the individual salts used were optimum for treatment with the one salt alone, i. e., the effect of mixed salt plus aluminum salt treatment would not be attained by using larger amounts than shown of either alkali metal salt alone or of aluminum salt alone used in said example.

I claim as my invention:

1. A new white titanium oxide pigmentary composition comprising the product obtainable by calcining hydrous titanium oxide and a minor proportion of a mixture of a soluble alkali metal compound and a compound of aluminum.

2. A white rutile titanium oxide pigmentary composition comprising the product obtainable by calcining low temperature converting hydrous titanium oxide from the hydrolysis of a titanium sulfate solution resulting from the sulfuric acid dissolution of Beach Sand Indian ilmenite ore, in the presence of a small amount of a mixture of a water-soluble alkali metal salt and a soluble salt of aluminum.

3. A white rutile titanium oxide pigmentary composition comprising the product obtainable by calcining low temperature converting hydrous titanium oxide from the hydrolysis of a titanium sulfate solution resulting from the sulfuric acid dissolution of Beach Sand Indian ilmenite ore, in the presence of a mixture comprising from about 0.05% to 2% of potassium sulfate and from about 0.01% to about 5.0% of aluminum sulfate calculated as the oxide and both amounts being on the $TiO_2$ basis.

4. A white rutile titanium oxide pigmentary composition comprising the product obtainable by calcining at temperatures ranging from substantially 850–975° C. low temperature converting hydrous titanium oxide from the hydrolysis of a titanium sulfate solution resulting from the sulfuric acid dissolution of Beach Sand Indian ilmenite ore, in the presence of a mixture comprising from about 0.05% to 2% of sodium and potassium sulfate and from about 0.05% to about 0.5% of aluminum sulfate, calculated as the oxide, said percentage amounts being on the $TiO_2$ basis.

5. A process for producing an improved titanium oxide pigment which comprises calcining hydrous titanium oxide in the presence of minor quantities of a soluble alkali metal compound and a compound of a polyvalent metal forming substantially white, insoluble oxides from the group consisting of aluminum, zinc, magnesium, and beryllium.

6. A process for producing an improved rutile titanium oxide pigment comprising calcining hydrous titanium oxide in the presence of a small amount of a mixture comprising a soluble alkali metal salt and a soluble salt of a polyvalent metal forming substantially white, insoluble oxides, from the group consisting of aluminum, zinc, magnesium, and beryllium.

7. A process for obtaining an improved rutile titanium oxide pigment which comprises calcining precipitated hydrous titanium oxide adapted to convert to rutile at a temperature ranging from 750–1000° C. in the presence of a mixture consisting of from about 0.01% to about 20%, based on the $TiO_2$, of at least one water-soluble, inorganic alkali metal salt, and from about 0.01% to about 5%, also on the $TiO_2$ basis, of a polyvalent metal forming substantially white, insoluble oxides from the group consisting of aluminum, zinc, magnesium, and beryllium.

8. A process for obtaining an improved rutile titanium oxide pigment which comprises subjecting precipitated, low temperature converting hydrous titanium oxide to calcination in the presence of a mixture comprising from about 0.05% to 2%, on the $TiO_2$ basis, of a water soluble inorganic alkali metal salt, and an amount of a compound of a polyvalent metal forming substantially white, insoluble oxides from the group consisting of aluminum, zinc, magnesium, and beryllium equivalent to from about 0.05% to about 0.5% of the corresponding oxide, and also based on the $TiO_2$ present.

9. A process for obtaining a rutile titanium oxide pigment exhibiting improved color, brightness and stability towards light, which comprises subjecting hydrous titanium oxide from the hydrolytic precipitation of a titanium sulfate solution derived from the sulfuric acid attack of Beach Sand Indian ilmenite ore, to calcination treatment while admixed with a small amount of a mixture, comprising water-soluble, inorganic alkali metal salt and a soluble salt of a polyvalent metal forming substantially white, insoluble oxides from the group consisting of aluminum, zinc, magnesium, and beryllium.

10. A process for obtaining a relatively stable, rutile titanium oxide pigment exhibiting commercially satisfactory color, brightness and light-resistance properties which comprises calcining hydrous titanium oxide adapted to convert to rutile at a temperature ranging from 750–1000° C. obtained from the hydrolysis of a titanium sulfate solution resulting from the $H_2SO_4$ dissolution of Beach Sand Indian ilmenite ore, at temperatures ranging from substantially 750° C. to not in excess of substantially 1000° C., while admixed with a small amount of a mixture comprising an alkali metal sulfate and a sulfate of a polyvalent metal from the group consisting of aluminum, zinc, magnesium, and beryllium.

11. A process for obtaining a relatively stable, rutile titanium oxide pigment having commercially satisfactory color, brightness and light-resistance characteristics, which comprises calcining precipitated anatase titanium oxide, adapted to convert to rutile at a temperature ranging from 750–1000° C., resulting from the H₂SO₄ dissolution of Beach Sand Indian ilmenite, in the presence of a small amount of a mixture comprising a soluble, inorganic alkali metal compound and an aluminum compound.

12. A process for obtaining a relatively stable, rutile titanium oxide pigment having commercially satisfactory color, brightness and light-resistance characteristics, which comprises calcining precipitated anatase titanium oxide adapted to convert to rutile at a temperature ranging from 750–1000° C., resulting from the H₂SO₄ dissolution of Beach Sand Indian ilmenite, in the presence of a small amount of a mixture comprising a soluble, inorganic alkali metal compound and a zinc compound.

13. A process for obtaining a relatively stable, rutile titanium oxide pigment having commercially satisfactory color, brightness and light-resistance characteristics, which comprises calcining precipitated anatase titanium oxide adapted to convert to rutile at a temperature ranging from 750–1000° C., resulting from the H₂SO₄ dissolution of Beach Sand Indian ilmenite, in the presence of a small amount of a mixture comprising a soluble, inorganic alkali metal compound and a magnesium compound.

14. A process for obtaining a relatively stable, rutile titanium oxide pigment having commercially satisfactory color, brightness and light-resistance characteristics, which comprises calcining precipitated hydrous titanium oxide adapted to convert to rutile at a temperature ranging from 750–1000° C., resulting from the H₂SO₄ dissolution of Beach Sand Indian ilmenite, at temperatures ranging from substantially 850 C. to 975° C. in the presence of a minor quantity of a mixture comprising sodium, potassium and aluminum sulfates.

15. A process for obtaining a relatively stable, rutile titanium oxide pigment having commercially satisfactory color, brightness and light-resistance characteristics, which comprises calcining precipitated hydrous titanium oxide adapted to convert to rutile at a temperature ranging from 750–1000° C. resulting from the H₂SO₄ dissolution of Beach Sand Indian ilmenite, at temperatures ranging from substantially 950° C. to 975° C. in the presence of a minor proportion of a mixture comprising potassium sulfate and zinc sulfate.

16. A process for obtaining a relatively stable, rutile titanium oxide pigment having commercially satisfactory color, brightness and light-resistance characteristics, which comprises calcining precipitated hydrous titanium oxide adapted to convert to rutile at a temperature ranging from 750–1000° C. resulting from the H₂SO₄ dissolution of Beach Sand Indian ilmenite, at temperatures ranging from substantially 850° C. to 975° C. in the presence of a minor proportion of a mixture comprising potassium sulfate and magnesium sulfate.

17. A process for obtaining an improved rutile titanium oxide pigment exhibiting commercially satisfactory color, brightness and light-resistance characteristics which comprises calcining precipitated hydrous TiO₂ adapted to convert to rutile at a temperature ranging from 750–1000° C. obtained from the hydrolysis of a titanium sulfate solution resulting from the H₂SO₄ dissolution of Beach Sand Indian ilmenite, at temperatures ranging from substantially 750° C. to 1000° C. in the presence of a mixture comprising from about 0.05% to 2% of potassium sulfate and from about 0.05% to about 0.5% of aluminum sulfate calculated as the oxide, both amounts being on the TiO₂ basis.

18. A process for obtaining an improved rutile titanium oxide pigment exhibiting commercially satisfactory color, brightness and light-resistance characteristics which comprises calcining precipitated hydrous TiO₂ adapted to convert to rutile at a temperature ranging from 750–1000° C. obtained from the hydrolysis of a titanium sulfate solution produced through sulfuric acid dissolution of Beach Sand Indian ilmenite, at temperatures ranging from substantially 850–975° C. in the presence of a mixture comprising from about 0.05% to 2% of sodium and potassium sulfates and from about 0.05% to about 0.5% of aluminum sulfate, calculated as the oxide, said percentage amounts being on the TiO₂ basis.

19. A white rutile titanium oxide pigmentary composition comprising with the product obtainable by calcining hydrous titanium oxide from the hydrolysis of a titanium sulfate solution resulting from the sulfuric acid dissolution of Beach Sand Indian ilmenite ore in the presence of a mixture comprising from about .05% to 2% of potassium sulfate, and from about .01% to about 5.0% of magnesium sulfate, calculated as the oxide, and both amounts being on the TiO₂ basis.

20. A process for producing an improved white titanium oxide pigmentary composition which comprises calcining hydrous titanium oxide at a temperature ranging from about 750 C.–1000° C., in the presence of a minor proportion of a mixture of a soluble alkali metal compound and a compound of aluminum.

JAMES HOWARD PETERSON.